United States Patent
Bendersky et al.

(10) Patent No.: US 9,734,148 B2
(45) Date of Patent: Aug. 15, 2017

(54) INFORMATION REDACTION FROM DOCUMENT DATA

(71) Applicant: Google Inc., Mountain View, CA (US)

(72) Inventors: Mike Bendersky, Sunnyvale, CA (US); Vanja Josifovski, Los Gatos, CA (US); Amitabh Saikia, Mountain View, CA (US); Marc-Allen Cartright, Stanford, CA (US); Jie Yang, Santa Clara, CA (US); Luis Garcia Pueyo, San Francisco, CA (US); MyLinh Yang, Saratoga, CA (US)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 14/520,018

(22) Filed: Oct. 21, 2014

(65) Prior Publication Data
US 2016/0110352 A1 Apr. 21, 2016

(51) Int. Cl.
G06F 17/30 (2006.01)
G06F 21/62 (2013.01)
G06F 21/64 (2013.01)
G06Q 10/10 (2012.01)
G06Q 30/02 (2012.01)

(52) U.S. Cl.
CPC .... *G06F 17/30011* (2013.01); *G06F 21/6218* (2013.01); *G06F 21/6227* (2013.01); *G06F 21/6254* (2013.01); *G06F 21/64* (2013.01); *G06Q 10/101* (2013.01); *G06Q 30/0254* (2013.01)

(58) Field of Classification Search
CPC ............... G06F 17/30011; G06F 21/60; G06F 21/6218; G06F 21/6227; G06F 21/6254; G06F 21/64; G06Q 10/101; G06Q 30/0254
See application file for complete search history.

(56) References Cited

U.S. PATENT DOCUMENTS

| | | | |
|---|---|---|---|
| 7,484,107 B2 * | 1/2009 | Forlenza | H04L 9/088 380/260 |
| 7,802,305 B1 | 9/2010 | Leets | |
| 7,876,335 B1 * | 1/2011 | Pittenger | G06F 17/21 345/619 |
| 8,291,065 B2 | 10/2012 | Goodman | |
| 9,081,978 B1 * | 7/2015 | Connolly | G06F 21/62 |
| 2007/0288458 A1 * | 12/2007 | Kacmarcik | G06F 17/274 |
| 2009/0089663 A1 | 4/2009 | Rebstock et al. | |
| 2010/0024037 A1 | 1/2010 | Grzymala-Busse | |
| 2010/0070518 A1 | 3/2010 | Park | |

(Continued)

OTHER PUBLICATIONS

Ikawa et al., A New Document Masking Approach for Removing Confidential Information, 2007, pp. 1-6.*

(Continued)

*Primary Examiner* — Jorge A Casanova
(74) *Attorney, Agent, or Firm* — Fish & Richardson P.C.

(57) ABSTRACT

Methods, systems, and apparatus, including computer programs encoded on a computer storage medium, for redacting data from a document collection generated for a set of documents that include personal information. The redaction of the data is based in part on a comparison of the document collection to a set of a personal documents of users for which the users have provided explicit approval to use in the processing of the document collection.

17 Claims, 4 Drawing Sheets

(56) References Cited

U.S. PATENT DOCUMENTS

| | | |
|---|---|---|
| 2010/0215758 A1 | 8/2010 | Opheim |
| 2011/0060905 A1 | 3/2011 | Stack |
| 2011/0265177 A1 | 10/2011 | Sokolan et al. |
| 2012/0159296 A1* | 6/2012 | Rebstock ............... G06Q 10/00 |
| | | 715/205 |
| 2012/0303558 A1 | 11/2012 | Jaiswal |
| 2013/0272523 A1* | 10/2013 | McCorkindale ......... H04N 1/44 |
| | | 380/243 |
| 2014/0149322 A1 | 5/2014 | Lavoie et al. |
| 2014/0208418 A1 | 7/2014 | Libin |
| 2014/0278909 A1* | 9/2014 | Potter ................ G06Q 30/0242 |
| | | 705/14.41 |
| 2015/0071542 A1* | 3/2015 | Dahl .................. G06K 9/00442 |
| | | 382/177 |

OTHER PUBLICATIONS

International Search Report and Written Opinion in International Application No. PCT/US2015/056030, mailed Jan. 22, 2016, 13 pages.

\* cited by examiner

INFORMATION REDACTION FROM DOCUMENT DATA

BACKGROUND

This specification relates to information processing.

The advent of cloud-based hosting services has enabled many opportunities for service developers to offer additional services that are of much utility to users. Examples of such services include automatically generating electronic reminders for users, providing advertisements that may be of particular interest to particular users, providing suggestions for activities in which the user may be interested, and the like.

To offer these services, a service provider may process a large set of documents for a large number of users in an effort to determine particular patterns in the documents that are indicative of a need for a particular service. To illustrate, a service provider may process messages from an on-line retailer and determine that an order confirmation includes data describing a product and a delivery date. Using this information, the service provider may generate an automatic reminder for a user that serves to remind the user the product is to be delivered on a certain day.

Such information derived from the documents and that is used by a service provider to provide services is generally referred to as a "document data collection." A document data collection can take different forms, depending on how the data are used. For example, a document data collection can be a cluster of documents or a cluster of terms from the documents, where the data are clustered according to a content characteristic. Example content characteristics include the document being a confirmation e-mail from an on-line retailer, or messages sent from a particular host associated with a particular domain, etc. Another type of document data collection is a template that describes content of the set of documents in the form of structural data. Other types of document data collections can also be used.

A service provider may need to analyze and modify the document data collection to improve the performance of the services that utilize the collection. Examination of private data, however, is often prohibited, i.e., a human reviewer cannot view or otherwise have access to the document data collection. Usually during the generation of the document data collection any private user information is removed and not stored in the document data collection; regardless, examination by a human reviewer is still prohibited to preclude any possibility of an inadvertent private information leak. While such privacy safeguards are of great benefit to users, analyzing and improving the quality of the document data collection and the services that use the document data collection can be very difficult due to the access restrictions.

SUMMARY

In general, one innovative aspect of the subject matter described in this specification can be embodied in methods that include the actions of receiving, by a data processing apparatus, an electronic document data collection generated from a first set of documents, the document data collection including a first set of fixed phrases extracted from the first set of documents, wherein each fixed phrase is a phrase of one or more terms that is determined to not present a personal information exposure risk, and wherein access to the document data collection for examination by a human reviewer is precluded; receiving, by the data processing apparatus, a second set of documents, the second set of documents including documents that are each a personal document of a user that has personal information of the user and for which the user has provided permission to use the document for processing of the fixed phrases extracted from the first set of documents; extracting, by the data processing apparatus, candidate phrases from the second set of documents, each candidate phrase being a phrase of one or more terms; identifying, by the data processing apparatus, fixed phrases extracted from the first set of documents that match candidate phrases extracted from the second set of documents; generating, from the document data collection, a redacted document data collection in which each fixed phrase that does not match a candidate phrase is redacted, and each fixed phrase that does match a candidate phrase is not redacted; and providing, by the data processing apparatus, access to the redacted document data collection for examination by a human reviewer. Other embodiments of this aspect include corresponding systems, apparatus, and computer programs, configured to perform the actions of the methods, encoded on computer storage devices.

Particular implementations of the subject matter described in this specification can realize one or more of the following advantages. The subject matter enables analysis and debugging of data collection processes by redacting, e.g., obfuscating or removing, potentially private information given a set of documents that were donated by users. The set of donated documents may or may not be explicitly examined, but the users have given explicit permission for the documents to be used for evaluating a data collection. This approach significantly improves the ability to analyze and evaluate the quality of data collections derived over personal data. This approach also significantly speeds up the development in projects that deal with document data derived from private data. This enables to develop algorithms that use supervised machine learning over private data without compromising privacy.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A document data collection is generated from a set of documents that include private information. As used in this specification, "private information" or "personal information" is information that is specific to a particular user, and may include information that is not widely known. The information may be personally identifying, such as an account number, or may describe content specific to the user, such as the name of a product purchased by the user, and a delivery date for the product. Private information may in some examples also include information specific to a limited group of users.

To protect user privacy, a document data collection generated from or including private information should not be examined by human evaluators. However, such protections complicate the process of tuning a data collection algorithm, or creating and tuning a service process that uses the data collection. Thus, to allow such evaluation, the document data collection is compared to data derived from a set of "donated documents." Each donated document is a personal document of a user that has personal information of the user and for which the user has provided permission to use the document for processing of the document data collection.

Information in the document data collection that is also in the donated documents can be revealed to human evaluators, as the users to whom the information belongs have expressly consented to use of the information for evaluation. The remaining information in the document data collection is redacted, e.g., obfuscated or removed, so that human evaluators cannot examine the remaining data.

These features and additional features are described in more detail below.

Figure 1:
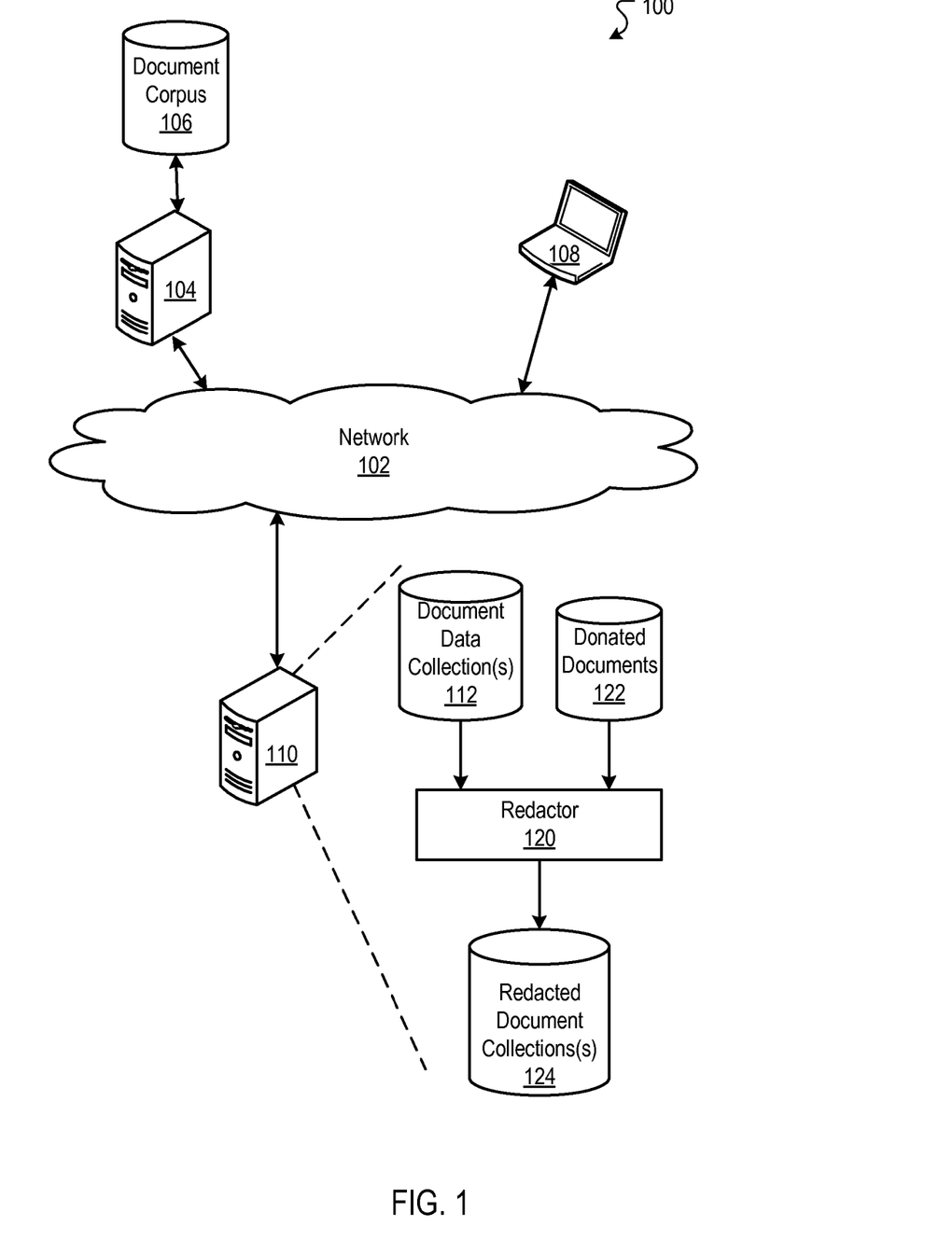
FIG. 1 is a block diagram of an example environment in which information is redacted from a document data collection.

FIG. 1 is a block diagram of an example environment 100 in which information is redacted from a document data collection. A computer network 102, such as a local area network (LAN), wide area network (WAN), the Internet, or a combination thereof, connects a service provider 104, a document corpus 106, user devices 108, and a document data collection processor 110.

The service provider 104 can be any number of service providers, such as a cloud-based mail provider, a cloud-based document hosting service, etc. The document corpus 106 stores documents that correspond to the service provided by the service provider. For example, for a cloud-based mail provider 104, the document corpus 106 may be a collection of user e-mail messages. Likewise, for a cloud-based document hosting service 104, the document corpus 106 may be a collection of word processing documents, spreadsheets, etc.

A user device 108 is an electronic device capable of requesting and receiving resources over the network 102. Example user devices 108 include personal computers, mobile communication devices, and other devices that can send and receive data over the network 102. A user device 108 typically includes a user application, such as a web browser, to facilitate the sending and receiving of data over the network 102. The web browser can enable a user to display and interact with text, images, videos, music and other information typically located on a web page at a website on the World Wide Web or a local area network.

A user uses the user device 108 to create, send and manage documents using the service provided by the service provider 104. Many of these documents may include information that is personal to the user.

The document data collection processor 110 processes documents from the document corpus 106 to generate a document data collection 112. The document data collection 112 may be used by the service provider 104 (or another service provider different from the service provider 104) to provide services to users. For example, a back-end process for a digital personal assistant service may use a document data collection 112 to process messages from an on-line retailer to identify order confirmations that each includes data describing a product and a delivery date. Using this information, the service provider generates an automatic reminder for a user that serves to remind the user the product is to be delivered on a certain day.

To provide such services, however, the service provider implements a process that operates on the document data collection 112. In some implementations, the document data collection 112 describes structure content of documents in a manner that allows for identification of information relevant for a particular service. For example, for a particular on-line retailer, an analysis of confirmation messages may reveal that each order confirmation includes the following text:

Account No.:
Order No.:
Product Description:
Delivery Date:

Information describing this structure is stored in the document data collection 112. For example, the document data collection 112 may include templates that describe the structure of certain phrases in certain messages and, should the template match a message, a corresponding service operation may be invoked for the user/recipient of the message.

In some implementations, the document data collection processor 110 is programmed to distinguish between private and public information. Generally, public information can be referred to as "fixed" information or "fixed phrases." The document data collection processor 110 determines information is a fixed phrase if the information meets a privacy threshold. Information that meets a privacy threshold is determined to be information that does not present a personal information exposure risk.

An example privacy threshold is a requirement that a candidate fixed phrase extracted from a document collection must occur in a minimum number of user documents for at least a minimum number of users. For the document data collection processor 110 to determine a phrase is a fixed phrase, the phrase must appear in documents from at least N users at least M times, where M is greater than N. For example, N may be 100, and M may be 1000. Other values of N and M may also be used.

For example, with respect to the text described above, the term "Account No.:" in a message is always followed by a number. However, each account number occurs for only one user, and thus an account number will not meet the privacy threshold.

Document information that meets the privacy threshold is labeled as a fixed phrase. To enable a human evaluator to analyze the document collection, however, only information from a set of donated documents 122 is revealed. Using a redactor 120, the document data collection processor 110 generates a redacted document collection 124.

Figure 2:
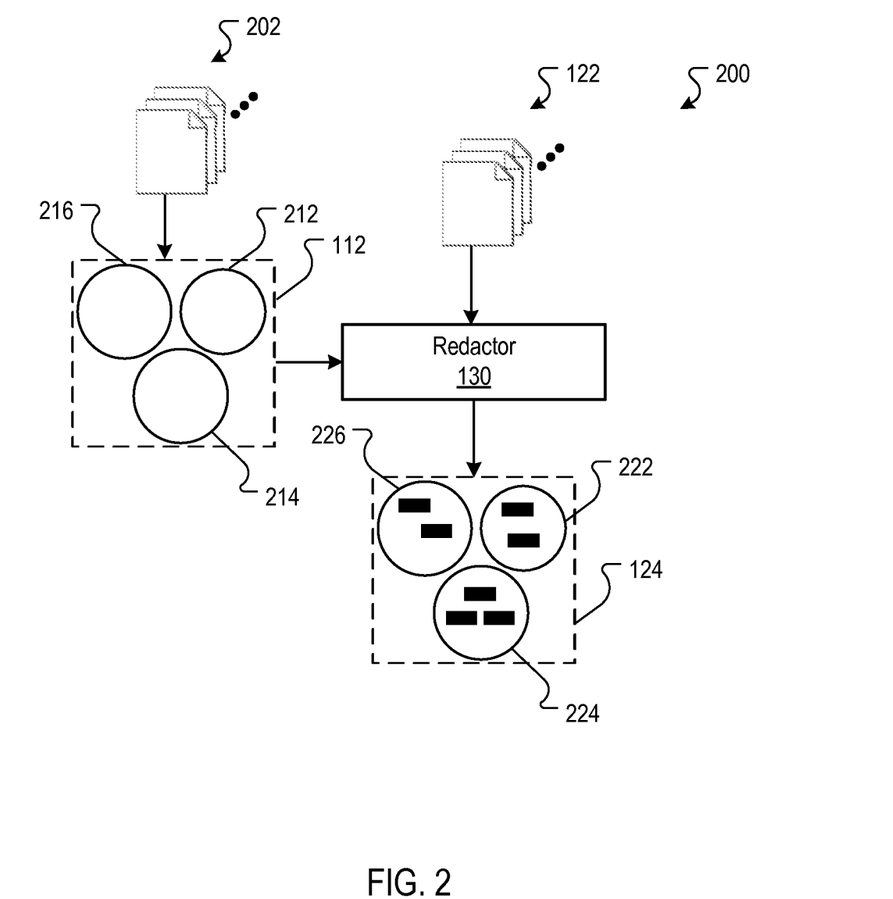
FIG. 2 is a system flow diagram for redacting information from a document data collection.
Figure 3:
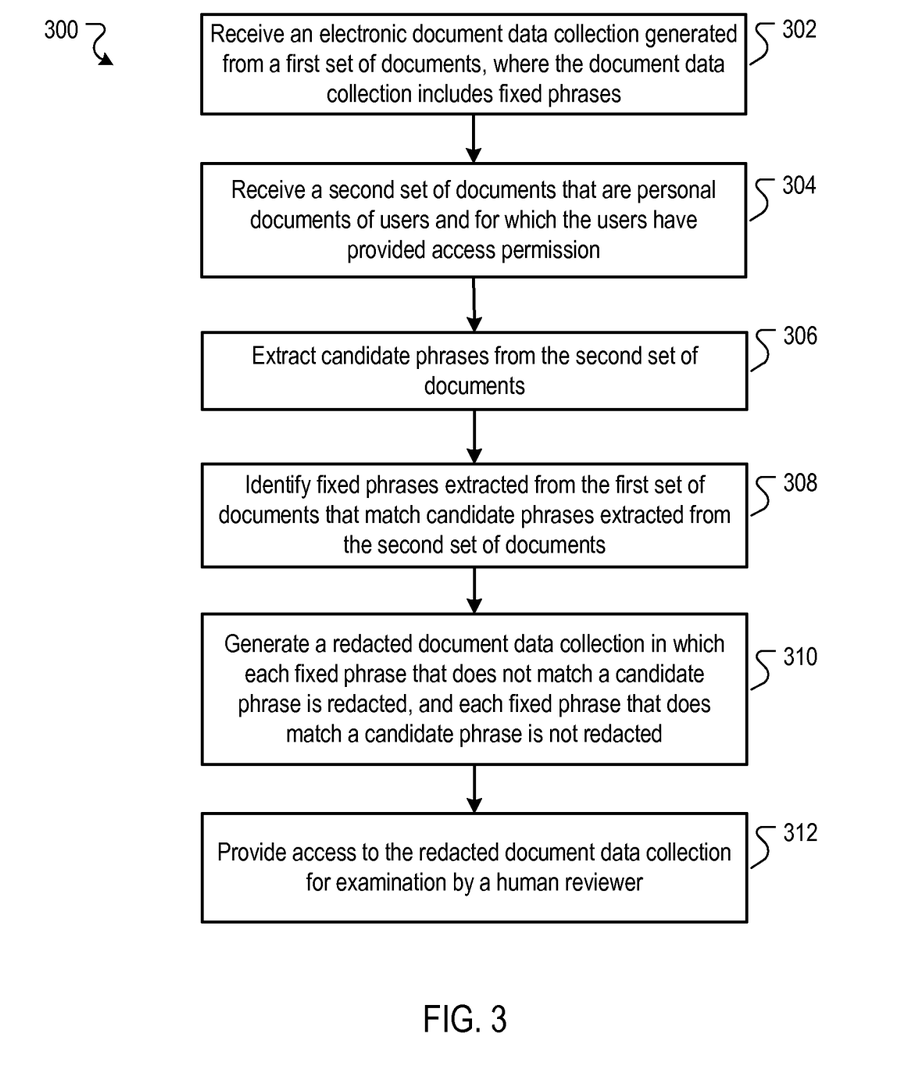
FIG. 3 is a flow diagram of an example process for redacting information from a document data collection.

Generation of the redacted document collection 124 is described with reference to FIGS. 2 and 3. In particular, FIG. 2 is a system flow diagram for redacting information from a document data collection, and FIG. 3 is a flow diagram of an example process 300 for redacting information from a document data collection. The operations of FIG. 2 are described with reference to FIG. 3. The process 300 of FIG. 3 can be implemented in a data processing apparatus of one or more computers.

The process 300 receives an electronic document data collection generated from a first set of documents, where the document data collection includes fixed phrases (302). For example, with reference to FIG. 2, the document data collection 112 generated from the first set of documents 202 is received by the redactor 130. Access to the document data collection for examination by a human reviewer is precluded, and thus the redactor 130 will undertake the process of redacting information from the data collection 112.

The document data collection 112 may include different types of data collections 212, 214 and 216. For example, the document data collection 112 may include templates, where each template describes content of the first set of documents 112 in the form of structural data. Different types of templates may be generated, each describing different types of content. The type(s) of content described may depend on the processes that utilizes the template.

Another type of document collection is a cluster. Each document cluster is clustered according to a content characteristic that is different for each document cluster. Again, the type of cluster(s) generated may depend on the processes that utilizes the template. Other types of document collections can also be processed by the redactor 130.

The process 300 receives a second set of documents 122 that include personal documents of users and for which the users have provided access permission (304). For example, the redactor 130 receives a set of donated documents 122 as the second set of documents. Each document in the second set of documents 122 is a personal document of a user that may have personal information of the user. The user, however, has provided permission to use the document for processing of the fixed phrases extracted from the first set of documents. Each user may provide permission, for example, by selecting the documents and indicating that the selected documents may be used for processing by the document data collection processor 110. Other ways of receiving explicit user permission may also be used.

In some implementations, the explicit permission only extends to using the donated documents to process the document data collections 112, and does not extend to human review of the donated documents 122. As will be described in more detail below, with this permission scheme, the donated documents 122 facilitate the revealing of certain portions of the document data collection but without exposure of the complete documents 122 for human review.

The donated documents 122 may be a subset of the first set of documents 202, and may also include additional documents not included in the documents 202. Other documents may also be included in the second set of documents, such as documents for which access permission is not required, e.g., public documents, public records, etc.

The process 300 extracts candidate phrases from the second set of documents (306). Each candidate phrase is a phrase of one or more terms. In some implementations, the candidate phrases must also meet a privacy threshold as determined by the content of the donated documents. In other implementations, the candidate phrases are not required to meet the privacy threshold.

Phrases can be extracted by a variety of techniques. One technique utilizes an n-gram analysis in which phrases according to one or more n-gram models, e.g., unigrams, bigrams, trigrams, etc., are identified. Another way of extracting phrases is by extracting textual nodes from the document object model (DOM) of the document and extracting non-empty text leaf nodes. Other extraction techniques can also be used.

The process 300 identifies fixed phrases extracted from the first set of documents that match candidate phrases extracted from the second set of documents (308). For example, the redactor 130 may identify exact phrase matches between the candidate phrases and the fixed phrases. Other matching techniques can also be used.

The process 300 generates a redacted document data collection in which each fixed phrase that does not match a candidate phrase is redacted, and each fixed phrase that does match a candidate phrase is not redacted (310). For example, as depicted in FIG. 2, the redactor 130 generates the redacted document data collection 124 in which portions of the data collection are redacted, as indicated by the blackened rectangles in collections 222, 224 and 226.

Figure 4:
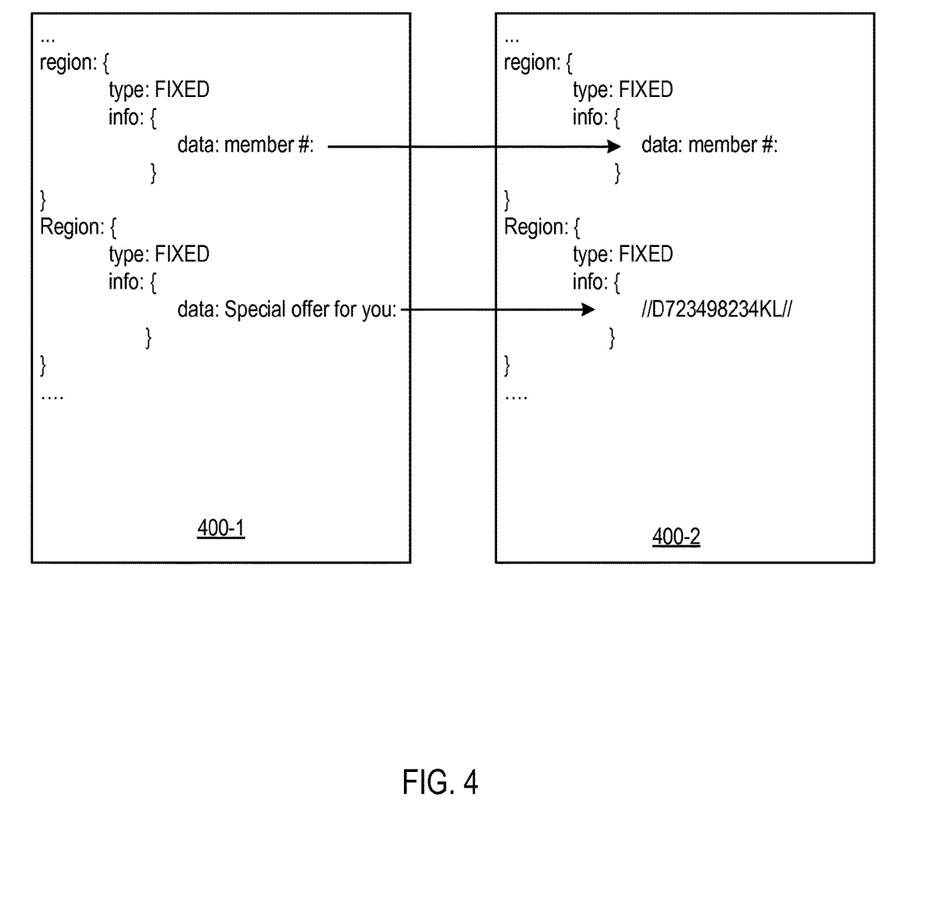
FIG. 4 depicts a portion of a document data collection before and after information redaction.

Various redaction techniques can be used. For example, in some implementations, the redacted document data collection 124 does not include the redacted fixed phrases. In other implementations, the fixed phrase that does not match a candidate phrase is redacted by obfuscation. One obfuscation technique involves generating a hash of the fixed phrase, the results of which are depicted in FIG. 4 and described in more detail below. Other redaction techniques can also be used.

The process 300 provides access to the redacted document data collection for examination by a human reviewer (312). For example, the redacted document data collection 124 may be sent to a computer and displayed to a human reviewer, and only fixed phrases that are not redacted, i.e., the fixed phrases that matched a candidate phrases from the set of donated documents 122, are displayed. The redacted fixed phrases, on the other hand, cannot be examined by the human reviewer.

Thus, by allowing display of only the fixed phrases that matched a candidate phrases from the set of donated documents 122, only data that a user has explicitly provided permission for user data to be examined by a human reviewer. This is because users that donate the donated documents 122 have agreed that phrases from those documents may be exposed for evaluation. Thus, while each of the fixed phrases in the document data collection 112 is likely to not include personal information, as each has passed the privacy threshold, the use of the donated documents 122 helps ensure that should a privacy leak, e.g., the unintentional release of private information, occur in the document data collection 112, the leak will be limited to only private information that a user has agreed may be exposed as part of an evaluation process.

FIG. 4 depicts a portion 400 of a document data collection before and after information redaction. The portion 400-1 is the document data collection depicting the data to which access by a human reviewer is precluded. Two fixed phrases are shown: "member #:" and "Special offer for you:". Assume the redactor 130 extracted the candidate phrase "member #:" but did not extract the candidate phrase "Special offer for you:". Because the fixed phrase "member #:" matched a candidate phrases, it is not redacted; however, because the fixed phrase "Special offer for you:" does not match a candidate phrase, it is redacted. In the example of FIG. 4, the redaction is accomplished by generating a hash to obfuscate the information.

The portion 400-2 is the resulting information that is displayed to a human reviewer. Thus, by use of the redactor 130 and donated documents 122, only document data that users have explicitly approved for exposure may be examined by a human reviewer.

In situations in which the systems discussed here collect personal information about users, or may make use of personal information, a user may be provided with an opportunity to control whether applications or features collect any such user information (e.g., information about a user's social network, social actions or activities, profession, a user's preferences, or a user's current location). A user may also be provided with one or more options to control whether and/or how the user may receive content that may be more relevant to that user. In addition, certain data may be treated in one or more ways before it is stored or used, so that the data is anonymized or personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus, the method comprising:
    receiving, by a data processing apparatus, an electronic document data collection generated from a first set of documents, the document data collection including a first set of fixed phrases extracted from the first set of documents, wherein each fixed phrase is a phrase of one or more terms that is determined to not present a personal information exposure risk, and wherein access to the document data collection for examination by a human reviewer is precluded;
    receiving, by the data processing apparatus, a second set of documents, the second set of documents including documents that are each a personal document of a user that has personal information of the user and for which the user has provided permission to use the document for processing of the fixed phrases extracted from the first set of documents;
    extracting, by the data processing apparatus, candidate phrases from the second set of documents, each candidate phrase being a phrase of one or more terms;
    identifying, by the data processing apparatus, fixed phrases extracted from the first set of documents that match candidate phrases extracted from the second set of documents;
    generating, from the document data collection, a redacted document data collection in which each fixed phrase that does not match a candidate phrase is redacted, and each fixed phrase that does match a candidate phrase is not redacted; and
    providing, by the data processing apparatus, access to the redacted document data collection for examination by the human reviewer.

2. The computer-implemented method of claim 1, wherein generating a redacted document data collection comprises generating a redacted document data collection in which each fixed phrase that does not match a candidate phrase is removed from the redacted document data collection, and each fixed phrase that does match a candidate phrase is included in the redacted document data collection.

3. The computer-implemented method of claim 1, wherein generating a redacted document data collection comprises generating an obfuscated document data collection in which each fixed phrase that does not match a candidate phrase is obfuscated, and each fixed phrase that does match a candidate phrase is not obfuscated.

4. The computer-implemented method of claim 3, wherein generating, from the document data collection, the obfuscated document data collection comprises generating, for each fixed phrase that does not match a candidate phrase, a hash of the fixed phrase to obfuscate the fixed phrase.

5. The computer-implemented method of claim 1, wherein the document data collection is a template that describes content of the first set of documents in the form of structural data.

6. The computer-implemented method of claim 1, wherein the document data collection is one of a plurality of document clusters, wherein each document cluster is clustered according to a content characteristic that is different for each document cluster.

7. The computer-implemented method of claim 1, wherein the data processing apparatus precludes access to each document in the second set of documents for examination by a human reviewer.

8. The computer implemented method of claim 1, further comprising generating, by the data processing apparatus, the electronic document data collection from the first set of documents, the generating the electronic document data collection comprising:
    extracting candidate fixed phrases from the first set of documents, each candidate fixed phrase being a phrase of one or more terms;
    for each candidate fixed phrase, determining whether the candidate fixed phrase presents a personal information exposure risk; and
    selecting only the candidate fixed phrases that are determined not to present a personal information exposure risk as the fixed phrases.

9. A computer storage medium encoded with a computer program, the program comprising instructions that when executed by data processing apparatus cause the data processing apparatus to perform operations comprising:
    receiving an electronic document data collection generated from a first set of documents, the document data collection including a first set of fixed phrases extracted from the first set of documents, wherein each fixed phrase is a phrase of one or more terms that is determined to not present a personal information exposure risk, and wherein access to the document data collection for examination by a human reviewer is precluded;

receiving, by the data processing apparatus, a second set of documents, the second set of documents including documents that are each a personal document of a user that has personal information of the user and for which the user has provided permission to use the document for processing of the fixed phrases extracted from the first set of documents;

extracting candidate phrases from the second set of documents, each candidate phrase being a phrase of one or more terms;

identifying fixed phrases extracted from the first set of documents that match candidate phrases extracted from the second set of documents;

generating, from the document data collection, a redacted document data collection in which each fixed phrase that does not match a candidate phrase is redacted, and each fixed phrase that does match a candidate phrase is not redacted; and providing access to the redacted document data collection for examination by the human reviewer.

10. A system, comprising:
a data processing apparatus; and
a computer storage medium encoded with a computer program, the program comprising instructions that when executed by the data processing apparatus cause the data processing apparatus to perform operations comprising:

receiving an electronic document data collection generated from a first set of documents, the document data collection including a first set of fixed phrases extracted from the first set of documents, wherein each fixed phrase is a phrase of one or more terms that is determined to not present a personal information exposure risk, and wherein access to the document data collection for examination by a human reviewer is precluded;

receiving, by the data processing apparatus, a second set of documents, the second set of documents including documents that are each a personal document of a user that has personal information of the user and for which the user has provided permission to use the document for processing of the fixed phrases extracted from the first set of documents;

extracting candidate phrases from the second set of documents, each candidate phrase being a phrase of one or more terms;

identifying fixed phrases extracted from the first set of documents that match candidate phrases extracted from the second set of documents;

generating, from the document data collection, a redacted document data collection in which each fixed phrase that does not match a candidate phrase is redacted, and each fixed phrase that does match a candidate phrase is not redacted; and providing access to the redacted document data collection for examination by the human reviewer.

11. The system of claim 10, wherein generating a redacted document data collection comprises generating a redacted document data collection in which each fixed phrase that does not match a candidate phrase is removed from the redacted document data collection, and each fixed phrase that does match a candidate phrase is included in the redacted document data collection.

12. The system of claim 10, wherein generating a redacted document data collection comprises generating an obfuscated document data collection in which each fixed phrase that does not match a candidate phrase is obfuscated, and each fixed phrase that does match a candidate phrase is not obfuscated.

13. The system of claim 12, wherein generating, from the document data collection, the obfuscated document data collection comprises generating, for each fixed phrase that does not match a candidate phrase, a hash of the fixed phrase to obfuscate the fixed phrase.

14. The system of claim 10, wherein the document data collection is a template that describes content of the first set of documents in the form of structural data.

15. The system of claim 10, wherein the document data collection is one of a plurality of document clusters, wherein each document cluster is clustered according to a content characteristic that is different for each document cluster.

16. The system of claim 10, wherein the data processing apparatus precludes access to each document in the second set of documents for examination by a human reviewer.

17. The system of claim 10, the operations further comprising generating the electronic document data collection from the first set of documents, the generating the electronic document data collection comprising:

extracting candidate fixed phrases from the first set of documents, each candidate fixed phrase being a phrase of one or more terms;

for each candidate fixed phrase, determining whether the candidate fixed phrase presents a personal information exposure risk; and selecting only the candidate fixed phrases that are determined not to present a personal information exposure risk as the fixed phrases.

* * * * *